J. M. ELDER.
ENGINE STARTER.
APPLICATION FILED DEC. 20, 1909.

990,643.

Patented Apr. 25, 1911.
5 SHEETS—SHEET 1.

WITNESSES:
J. H. Gardner.
K. R. Woddell.

INVENTOR:
James M. Elder,
BY
E. T. Silvius,
ATTORNEY.

J. M. ELDER.
ENGINE STARTER.
APPLICATION FILED DEC. 20, 1909.
990,643.
Patented Apr. 25, 1911.
5 SHEETS—SHEET 2.
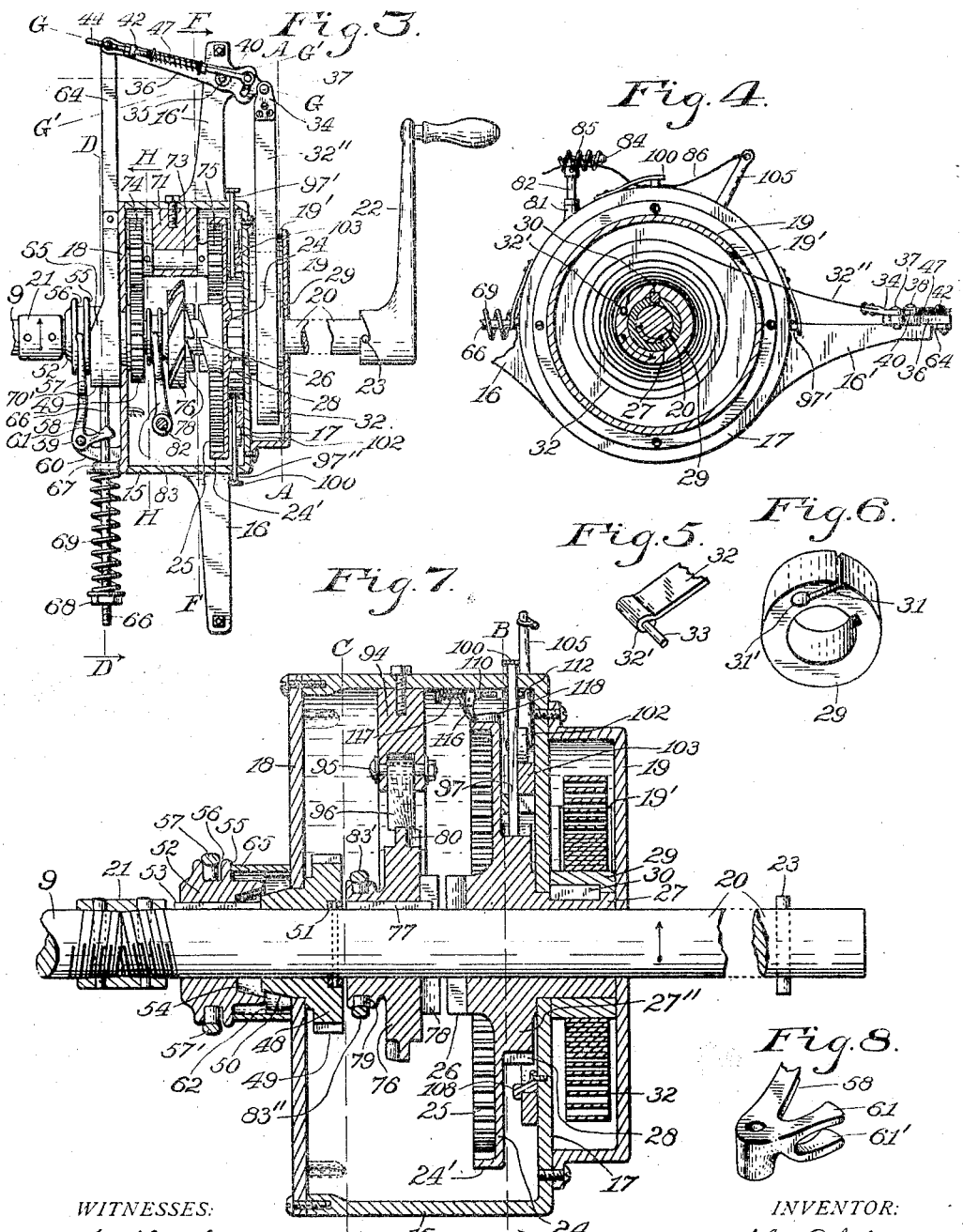
WITNESSES:
J. H. Gardner
K. R. Woddell
INVENTOR:
James M. Elder,
BY
E. T. Silvius.
ATTORNEY.

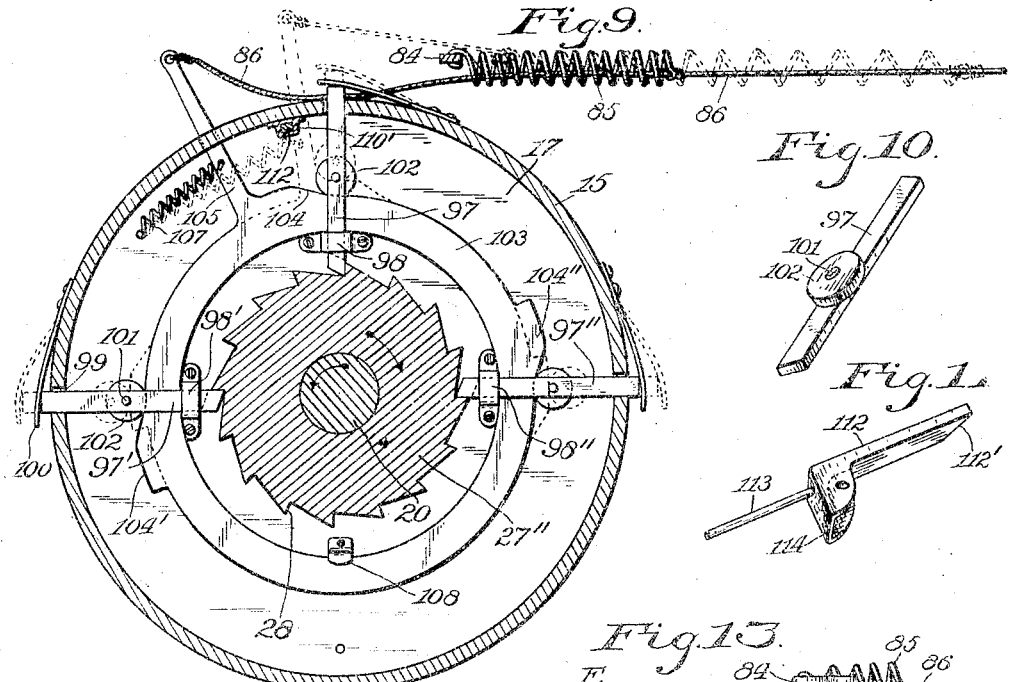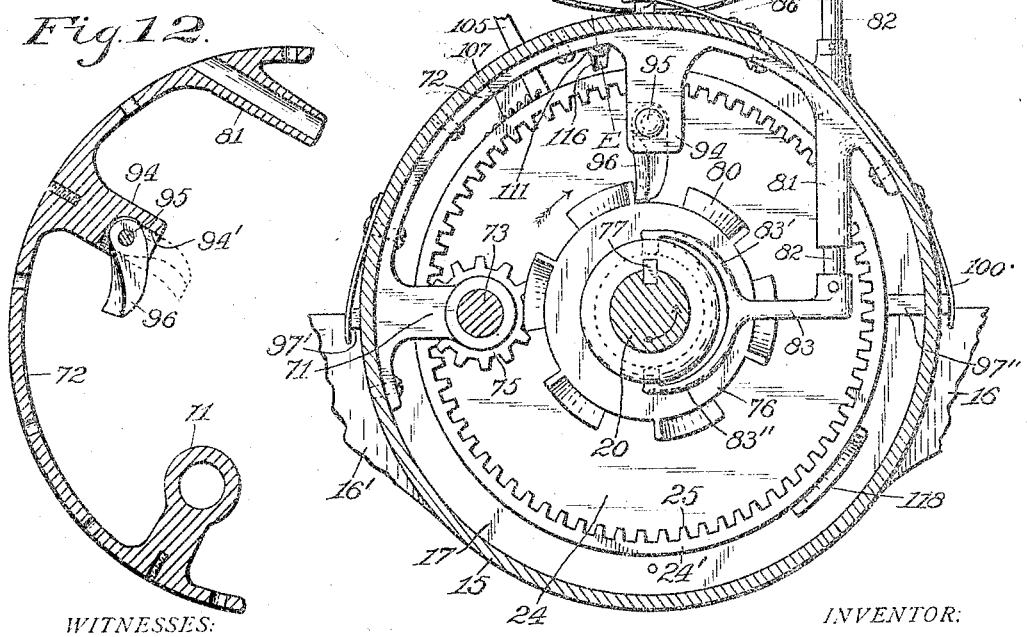

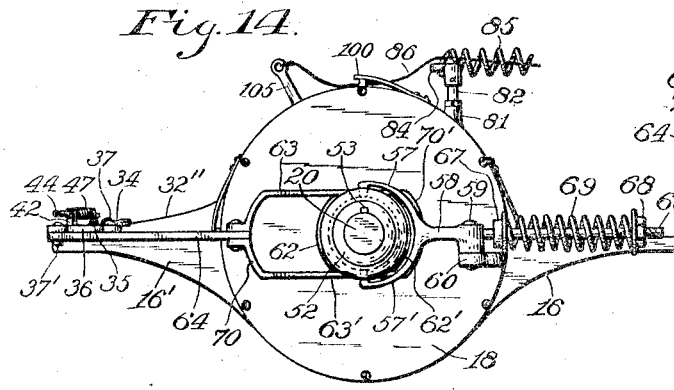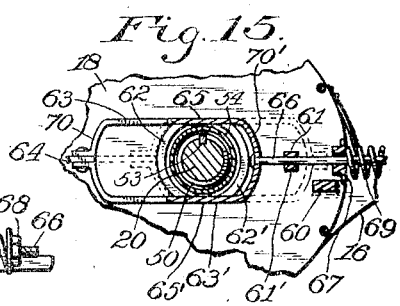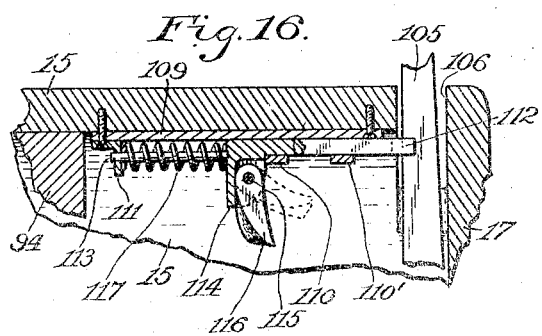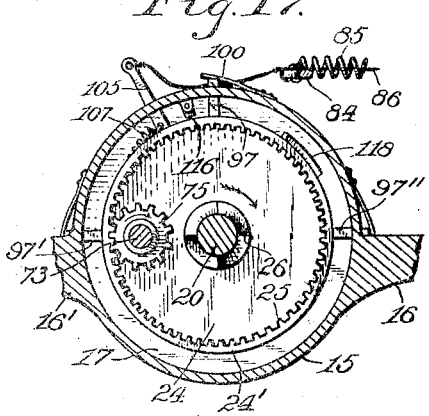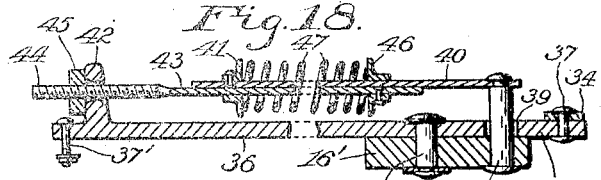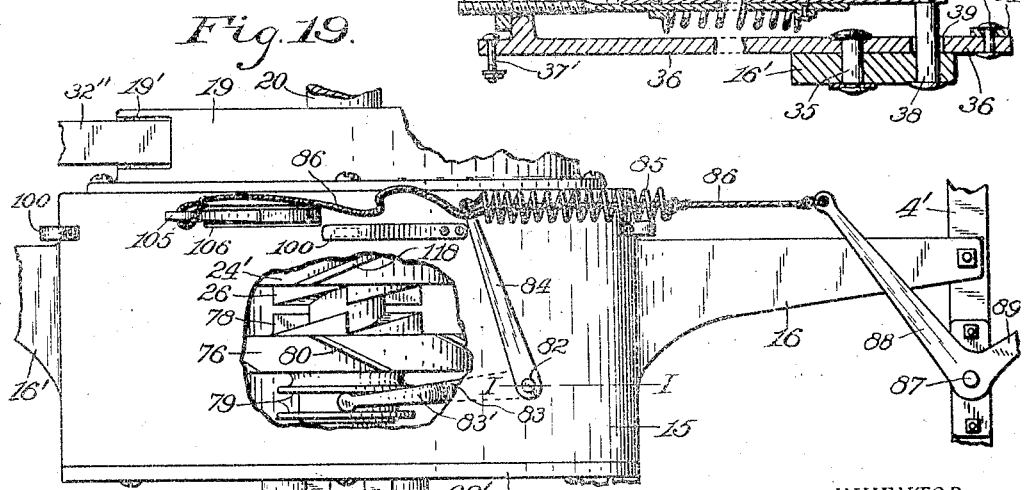

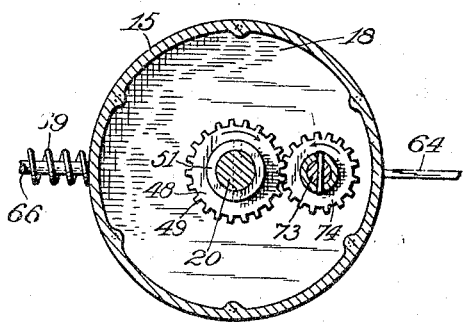
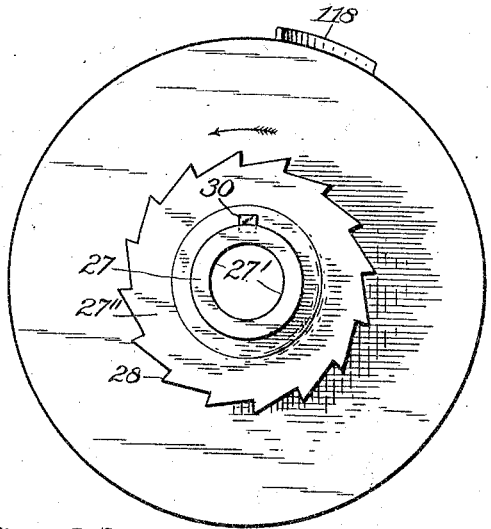
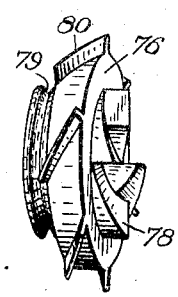
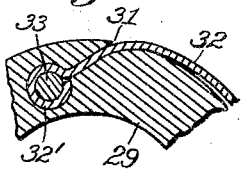
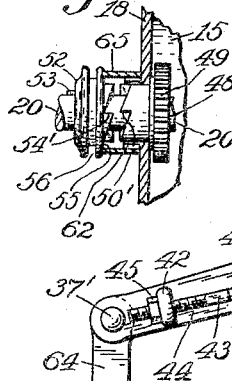
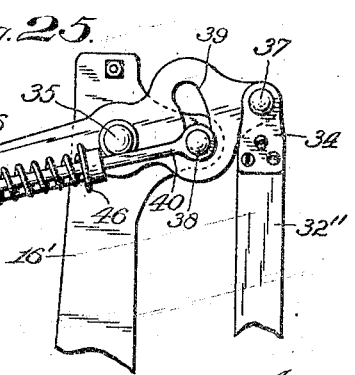
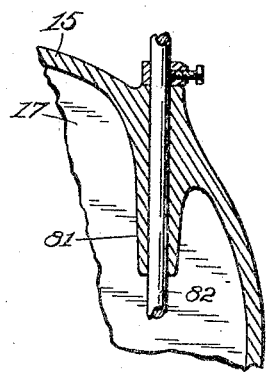

UNITED STATES PATENT OFFICE.

JAMES M. ELDER, OF INDIANAPOLIS, INDIANA.

ENGINE-STARTER.

990,643.

Specification of Letters Patent.

Patented Apr. 25, 1911.

Application filed December 20, 1909. Serial No. 534,103.

*To all whom it may concern:*

Be it known that I, JAMES M. ELDER, a citizen of the United States, residing at Indianapolis, in the county of Marion and State of Indiana, have invented certain new and useful Improvements in Engine-Starters; and I do declare the following to be a full, clear, and exact description of the invention, reference being had to the accompanying drawings, and to the letters and figures of reference marked thereon, which form a part of this specification.

This invention relates to machines whereby engines that are incapable of starting themselves may be started or given initial motion to be continued by the use of the motive force for operating the engines, the invention having reference more particularly to a spring-power machine for starting engines, especially adapted for starting explosion engines, the engine starter being designed more particularly for starting automobile engines.

The principal object of the invention is to provide a relatively simple and reliable engine starter that may be adapted to be constructed compactly so that it may be arranged and used in a relatively small and convenient space in automobiles, a further object being to provide an improved engine starter which, after having once been wound up manually shall be capable of automatic operation repeatedly under control of an attendant; a still further object being to provide an engine starter that will not be liable to be injured or deranged in case of back-firing of the engine.

The invention consists in an improved engine starter comprising a spring, means for connecting the spring with the engine for enabling the engine to wind or place the spring under stress, automatically acting means for disconnecting the engine from the spring when the latter is wound or put under stress, and controlling means whereby the spring is connected with the engine for starting the engine; and the invention consists further in the novel parts, and in the combinations and arrangements of parts as hereinafter particularly described and then defined in the accompanying claims.

Figure 1:
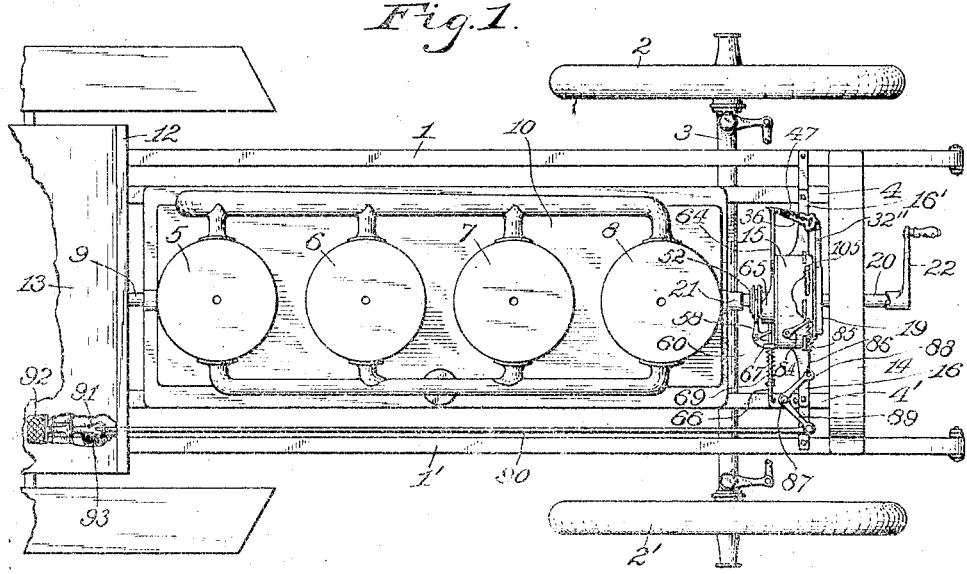
Figure 2:
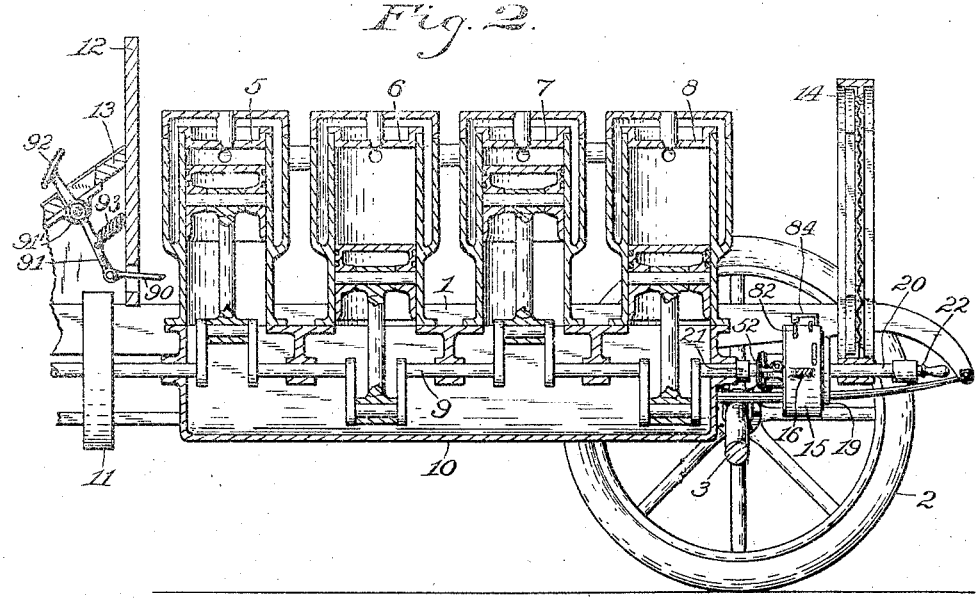

Referring to the drawings, Figure 1 is a top plan of a four cylinder automobile engine having the improved engine starter connected thereto and mounted on the forward portion of an automobile frame; Fig. 2, a vertical sectional elevation thereof; Fig. 3, a horizontal section of the engine starter; Fig. 4, a vertical section on the line A A in Fig. 3; Figs. 5 and 6, perspective views of devices for securing the inner end of the power spring to the winding apparatus; Fig. 7, a vertical central sectional view of the engine starter; Fig. 8, a fragmentary perspective view of one of the parts of clutch operating mechanism; Fig. 9, a vertical sectional view on the line B B in Fig. 7; Fig. 10, a perspective view of one of the dogs for holding the spring under tension; Fig. 11, a perspective view of a latch-bolt comprising a feature of the improvements; Fig. 12, a sectional detail of portions of the apparatus; Fig. 13, a vertical section on the line C C in Fig. 7; Fig. 14, an end elevation of the engine starter; Fig. 15, a fragmentary section on the line D D in Fig. 3; Fig. 16, a fragmentary sectional view on the line E E in Fig. 13; Fig. 17, a fragmentary sectional view on the line F F in Fig. 3; Fig. 18, a fragmentary sectional view of parts of clutch operating mechanism approximately on the line G G in Fig. 3; Fig. 19, a fragmentary top plan of the engine starter; Fig. 20, a vertical section on the line H H in Fig. 3; Fig. 21, an elevation of one of the gear wheels of the apparatus; Fig. 22, a perspective view of one of the clutch members of the apparatus; Fig. 23, a fragmentary section showing the parts illustrated in Figs. 5 and 6 connected together; Fig. 24, a fragmentary sectional elevation of a modified form of clutch; Fig. 25, a top plan of parts of clutch operating mechanism; and Fig. 26, a fragmentary sectional detail on the line I I in Fig. 19.

Similar reference characters throughout the drawings indicate corresponding elements or features of construction herein referred to.

In the drawings so much of an automobile and its engine are illustrated as will serve to explain the arrangement and functions of the engine starter, the automobile comprising frame members 1 and 1', forward wheels 2 and 2', a forward axle 3, engine frame members 4 and 4', engine cylinders 5, 6, 7, 8, the engine crank shaft 9 in the crank-box 10, the engine balance wheel 11, the dash-board 12, the inclined floor part 13 adjacent to the dash-board, and the radiator frame 14.

The improved engine starter as preferably constructed comprises a supporting frame which as shown constitutes an inclosing casing for parts of the mechanism and adapted to hold oil for automatically lubricating the moving parts, the frame comprising a preferably cylindrical body part 15 provided with two oppositely extending arms 16 and 16' that are suitably secured to the engine frame, a head 17 on one end of the body part, and a head 18 on the opposite end of the body part. The head 17 has a spring case 19 on its outer side, the spring-case having an opening 19' therein through which the outer end of the spring may extend. The engine starter comprises also a rotative shaft 20 that has one end thereof connected to the crank-shaft 9 of the engine by a suitable coupling 21, the opposite or forward end of the shaft 20 having a crank 22 thereon by which the shaft may be manually turned in one direction by means of a pin 23 in the shaft to be engaged by the hub of the crank. The shaft 20 extends through the frame, the heads 17 and 18 having central apertures somewhat larger in diameter than the shaft, the shaft extending also through the front of the spring-case. An internal gear wheel 24 is provided of relatively large diameter, the same having a rim 24' provided on the inner side thereof with gear teeth 25, the side of the gear wheel that has the rim and gear teeth thereon being provided with a suitable number of clutch teeth 26 of the ratchet tooth type, the opposite side of the gear wheel having an extended hub 27, the wheel having a bore 27', and the hub has an enlarged portion adjacent to the gear wheel to constitute a ratchet wheel 27'' on which are ratchet teeth 28. The wheel 24 is rotatable on the shaft 20. A collar 29 is secured rigidly on the smaller end portion of the hub 27 by means of a key 30, the collar having a slot 31 extending from its periphery inward, and a circular recess 31' at the inner end of the slot. The power-spring 32 is composed of flat bar-steel and one end thereof is inserted in the slot and has a loop 32' formed thereon that is inserted in the recess and held tightly by means of a pin 33 driven into the loop, the spring being wound about the collar and the outer end 32'' extending out through the aperture 19' and provided with a coupling plate 34. The arm 16' is provided with a pivot 35 on which a lever 36 is mounted between its ends and near one end thereof, said end being provided with a pivot 37 whereby the coupling plate 34 is connected to the lever, the opposite end of the lever being provided with a pivot 37'. The arm 16' is provided also with a pivot 38 that extends through a slot 39 in the lever between the pivots 35 and 37. The lever is preferably provided with means whereby it is automatically held yieldingly in either one of its two possible positions in which it may be stopped when the lever is moved, so that either end of the slot is in contact with the pivot 38, said means preferably comprising a rod 40 connected to the pivot 38 and extending toward, but not to the pivot 37', the rod being provided at or near its end with a collar 41. The lever 36 has a lug 42 thereon and a rod 43 extends movably through the collar 41 alongside of the rod 40 and has a bolt end 44 thereon that extends through the lug and provided with an adjusting nut 45 that is seated against the outer side of the lug, the opposite end of the rod 43 having a collar 46 secured thereto that extends about the rod 40 and is movable thereon, a spring 47 being seated against the collars 41 and 46 and compressed to the desired extent by means of the adjusting nut 45, so that when the lever lies in the line G G it will be held in such position by means of the spring pressure, or when moved so as to lie in the line G' G' it will be held in such position except when moved by a force sufficient to overcome the spring pressure. The use of the spring 47 in connection with the lever 36 tends to produce quick action of the operating mechanism of the main clutch, and it is obvious that the same result may be attained by various equivalent means.

A main clutch member is provided which as shown comprises a gear wheel 48 having spur teeth 49 thereon which is rotative on the shaft 20 and in the central portion of the head 18, the gear wheel being at the inner side of the head and having a suitable clutch device as a cone 50 thereon at the outer side of the head 18, or as shown in Fig. 24 the clutch device may consist of one or more ratchet type teeth 50'. One side of the gear wheel 48 engages the inner side of the head 18 and is normally held thereto by a collar 51 secured to the shaft 20 at the opposite side of the gear wheel. Another shifting clutch member 52 is mounted on the shaft 20 and connected thereto by a spline 53 whereby the member may be turned by the shaft and permit of its movement toward or from the clutch device 50 or 50', the clutch member 52 having a cup 54 adapted to frictionally engage the cone 50 or it may have ratchet type teeth 54' to engage the teeth 50' to enable the shaft 20 to turn the gear wheel 48. The clutch member 52 has a shoulder 55 presented toward the head 18 and it has also a peripheral groove 56 into which fingers 57 and 57' of a shifter 58 extend, the shifter being mounted on a pivot 59 that is supported on a bracket 60 with which the head 18 is provided, the shifter being provided with two fingers 61 and 61'. The head 18 is provided on the outer side thereof with a pair of combined stops and guides 62 and 62' arranged at opposite sides of the shaft 20 at suitable distances therefrom, and they support and guide a yoke comprising two horizontal bars 63 and 63' and provided at one end thereof with a coupling bar 64 that is connected to the lever 36 by means of the pivot 37' on the longer end of the lever, the outer sides of the yoke having cams 65 and 65' thereon adapted to engage the shoulder 55 and disconnect the movable clutch member 52 from the companion clutch member when the lever 36 moves toward the position to bring it in the line G G, when the power-spring is under considerable stress. The opposite end of the yoke is provided with a rod 66 that extends through a guide 67 with which the head 18 is provided and has a threaded end on which is an adjusting-nut 68, a spring 69 being seated against the guide 67 and also against the nut and suitably compressed, so as to tend to draw the yoke and the lever 36 in the opposite direction when the power-spring is partially or nearly unwound, and so as to draw the cams away from the shoulder 55 and permit the clutch member 52 to be connected with the companion clutch member when the yoke engages the fingers 61 and 61', said rod 66 passing between the fingers, the yoke having ends 70 and 70' to be brought into contact with the stops 62 and 62'.

The cylindrical part 15 of the frame is provided on the inner side thereof with a journal box 71 which may be attached thereto by means of a frame-plate 72 or otherwise connected as may be preferred, and a shaft 73 is mounted rotatably in the journal-box and has a pinion 74 secured to one end thereof in mesh with the spur teeth 49 of the gear wheel 48, the opposite end of the shaft 73 having a pinion 75 secured thereto that is in mesh with the internal gear teeth 25 of the gear wheel 24, so that as will be seen when the gear wheel 48 is rotated with the shaft 20 the power-spring 22 is wound up or put under stress.

A starting clutch member 76 is mounted on the shaft 20, so as to move along the shaft, but is prevented from rotating thereon by means of a spline 77, one side of the clutch member having ratchet type clutch teeth 78 thereon adapted to engage the clutch teeth 26 when the clutch member is moved toward the gear wheel 24, the backs of the clutch teeth being beveled or slanting, as will be understood, and designed so that when the wheel 24 rotates in the direction that the engine shaft is designed to rotate the wheel 24 may cause the clutch member 76, and consequently the shaft to rotate in the proper direction, and it will be clear, therefore, that if the clutch member 76 is rotated in the opposite direction as the result of back-firing the teeth 78 will be forced out of engagement with the teeth 26 if the wheel 24 remains at rest or rotates slower than the clutch member 76. The opposite side of the clutch member 76 has an extended hub in the periphery of which is a groove 79. The periphery of the clutch member 76 has a suitable number of inclined ribs 80 thereon similar to the ribs or threads of the well known worm gear. The cylindrical part 15 of the frame is provided with a journal-box 81 which may be integral as in Fig. 26, or attached thereto as a part of the plate 72, and the shaft 82 is mounted vertically in the journal box and projects above the frame, the lower end of the shaft having a shifter arm 83 secured thereto that has fingers 83' and 83" extending into the groove 79 for controlling the clutch member 76. An arm 84 is secured to the upper end of the shaft 82 and has one end of a coil spring 85 connected thereto, the other end of the spring being connected to a cable 86 that extends through the coil of the spring. A pivot 87 is mounted on a suitable part of the engine frame or part of the automobile, and a bell crank having two arms 88 and 89 is mounted on the pivot, one arm being connected to the cable 86 and the other arm having a pull rod 90 or the like connected thereto that extends rearward through the dash-board 12 and is connected to the lower end of a lever 91 that is mounted between its ends on the pivot 91' and extends through the floor part 13, the upper end of the lever having a foot-plate 92 thereon, and the lever preferably is provided with a spring 93 to retract it after having been manually operated.

The cylindrical part 15 has a projection 94 on the inner side of the upper portion thereof which may suitably be formed as part of the plate 72 and thereby secured to the part 15, the projection having a recess therein at one side of which is a shoulder 94', a pivot 95 extending through the recess, and a dog 96 is mounted on the pivot to swing in one direction and be stopped in the opposite direction against the shoulder, the dog extending downward nearly to the periphery of the clutch member 76, so as to be engaged by the ribs 80 which when carried in one direction will swing the dog out of the way and pass by, but when moved in the opposite direction when the engine backfires the projections will engage the dog and force the clutch member 76 over to disconnect it from the gear wheel 24, and therefore prevent injury to parts of the spring gearing.

In order to hold the power-spring when under stress and release it to enable it to start the engine one or more dogs, as 97, 97', 97", are provided that engage the teeth 28 of the ratchet-wheel 27", the dogs being mounted to move longitudinally in guides 98, 98', 98", secured to the inner side of the head 17, the outer ends of the dogs being guided in apertures 99 in the cylindrical part 15 of the frame, each dog being provided with a suitable spring 100 adapted to normally push the dog inward to or toward the ratchet-wheel, so that when the spring is being wound it will be prevented from unwinding automatically by the dogs. In order to release the spring, so that it may give off its stored energy each dog is provided with an operating pin 101 which preferably has a roller 102 thereon, and an annular retractor frame 103 is mounted against the head 17 to rotate on the guides 98, 98', 98'', and has a suitable number of cams 104, 104', 104'', thereon adapted to engage the rollers and force the dogs outward away from the ratchet-wheel 27'' when the frame 103 is rotated in one direction, the frame being provided with an operating arm 105 that extends through a slot 106 in the upper portion of the frame part 15 and is connected to the cable 86, so that when the cable is pulled the dogs will be retracted. A spring 107 is connected to the head 17 and also to the arm 105 for moving the frame 103 in the reverse direction after having been moved by the cable 86. The frame 103 preferably is provided with another guide 108 that is secured to the head 17.

In order to temporarily hold the retractor frame 103 in the desired position after having been moved by means of the cable 86 a suitable latch is provided which preferably comprises a latch frame 109 mounted on the inner side of the cylindrical part 15 and provided with guides 110, 110', 111, a latch-bolt 112 having a spring guide 113 being mounted slidingly in the guides and provided with a projection 114 and a pivot 115 on which is mounted a dog 116 which is stopped against the projection when hanging vertically, but may swing away in one direction. A spring 117 is mounted on the spring-guide 113 and seated against the projection 114 and also against the guide 111 for projecting the latch-bolt, the end of which has a beveled side 112' enabling the arm 105 to retract the latch-bolt and pass it when moved by the cable 86. The periphery of the gear-wheel 24 has an oblique angled rib 118 thereon which may be moved into contact with the dog 116 when the latch-bolt 112 is projected, and when the wheel 24 moves in one direction it will cause the dog to swing out of the way, but when moved in the opposite direction will engage the dog on the opposite side thereof and force it over and thereby retract the latch-bolt 112, so as to release arm 105.

It will be obvious from the foregoing description that the engine starter is complete in itself and may be connected to the engines already in use, but it is clear that it may be built as a part of a new engine, the shaft 20 in such case being a continuation or extension of the crank-shaft whether integral or otherwise. And various modifications may fairly be made within the scope of the claims, as for instance various types of clutches may be employed for connecting the crank shaft of the engine with the gear wheel 48, various devices being permissible also for connecting the controlling device 90 with the arms 84 and 105, so that the arm 84 may be moved in advance of the arm 105 when starting the engine and permitting the arm 105 to be retracted in advance of the arm 84. Also in some cases the spring 47, or its equivalent, might be omitted from the lever 36; or any equivalent of the lever 36 may be employed.

In practical use the engine at first starting is cranked by hand as usual, assuming, of course, that the spring 32 is not under stress and that the spring 69 holds the yoke end 70' in contact with the fingers 61 and 61', and therefore, holds the main clutch in operative position connecting the main shaft with the wheel 48 of the winding gearing, and the rotation of the shaft, therefore causes the gearing to begin winding up the spring. As soon as the engine begins to operate normally it will continue to wind up the spring to a desired degree predetermined when adjusting the springs 47 and 69, and when that degree is reached the lever 36 is drawn quickly to mid-position and more quickly forced beyond to its position in the line G G by the action of the spring 47, so that the main clutch members are quickly operated to disconnect the main-shaft from the winding gearing, and it will be understood, of course, that the spring 32 is prevented from unwinding by the ratchet-wheel 27'' and its dogs. If when first starting the engine back-firing occurs, as may be the case, if the clutch members have the ratchet teeth 50' and 54' thereon it is clear that when the shaft rotates backward the clutch member 52 will be forced out of engagement with the companion clutch member, and it is clear that a similar result may be attained with suitable construction in the use of a friction clutch. The engine, as will be seen, may operate as usual while the power-spring remains under stress and ready to start the engine after having been stopped. When it is desired to again start the engine the operator's foot may be placed on the foot-plate 92 whereby the lever 91 is operated to pull the cable 86 which, being connected to the spring 85, and the latter being relatively stiff moves the arm 84 and consequently throws the clutch teeth 78 into engagement with the teeth 26, and with further movement of the cable 86 the spring 85 stretches until slack of the cable between its connection with the spring and the arm 105 is taken up, the cable then moving the arm against the latch-bolt 112, and retracting it passes by, after which the latch-bolt is automatically projected behind the arm 105, as indicated in Fig. 9 and holds it against return, the movement of the frame 103 retracting the dogs from the ratchet-wheel 27" and therefore releasing the power-spring which begins to unwind and therefore rotate the gear wheel 24, and therefore rotate the clutch member 76 and with it the main shaft. During rotation of the wheel 24 the rib 118 will engage the dog 116 and simply swing it out of the way. As soon as the power-spring has started the engine and the engine begins to operate under its motive force it will gain in speed, and the lever 91 having been released and retracted, the main shaft will rotate faster than the wheel 24 and therefore force the clutch teeth 78 out of contact with the teeth 26 which, as will be seen, disconnects the engine from the starting spring, but the stress of the spring having become reduced to the desired extent the spring 69 automatically causes the main clutch to connect the main shaft with the winding gear wheel 48, so that the engine begins at once to rewind the spring to the desired degree of stress, and during the winding process the wheel 24 carries the rib 118 into contact with the dog 116 and thereby retracts the latch-bolt 112 which releases the arm 105 and permits the spring 107 to retract the frame 103, so as to permit the dogs, as 97, to be projected into contact with the ratchet wheel 27" to prevent unwinding of the power-spring when under stress, and as before explained when under stress to the desired extent the lever 36 is shifted, so as to operate the main clutch to disconnect the main shaft from the winding gear wheel 48 as before.

Having thus described the invention, what is claimed as new, is—

1. An engine starter including a rotatable shaft, a gear-wheel rotatably supported, a spring connected with the gear-wheel, a lever pivotally supported and connected to the spring to be moved thereby in one direction, a spring for moving the lever in the opposite direction, gearing operatively connected with the gear-wheel, and clutch-coupling mechanism connected with the lever for connecting the gearing detachably with the shaft.

2. An engine starter including a rotatable shaft, a gear-wheel rotatable on the shaft, a spring connected with the gear-wheel, gearing operatively connected with the gear-wheel, clutch-coupling mechanism for detachably connecting the gearing with the shaft, movable controlling apparatus connected to the spring and the clutch-coupling mechanism and operated by the spring in one direction, and a spring for operating the controlling apparatus in the opposite direction.

3. An engine starter including a rotatable shaft, a gear-wheel rotatable on the shaft, a spring connected with the gear-wheel, gearing operatively connected with the gear-wheel, clutch-coupling mechanism for operatively connecting the gearing with the shaft, a ratchet-wheel connected with the gear-wheel, a dog movably supported in contact with the ratchet-wheel, a lever pivotally supported and connected with the spring to be moved thereby in one direction, connections between the lever and the clutch-coupling mechanism, a spring for moving the lever in the opposite direction, and means for accelerating the movement of the lever in either direction.

4. An engine starter including a rotatable shaft, a gear-wheel rotatable on the shaft and having a ratchet-wheel and also a clutch member thereon, a spring connected with the gear-wheel to be put under stress thereby, a dog movably supported in contact with the ratchet-wheel, a clutch device splined to the shaft and movable into engagement with the clutch member, and means for moving the clutch device connected therewith and also with the dog to retract it.

5. An engine starter including a rotatable shaft, a rotative gear-wheel, a movable controlling device, a spring connected with the gear-wheel to be put under stress thereby and having connection with the controlling device and when under stress moving the device in one direction, a clutch member operatively connected with the gear-wheel, movable clutch mechanism for connecting and disconnecting the shaft with the clutch member and operatively connected with the controlling device, and means for automatically moving the controlling device in the opposite direction when the spring is relieved of stress.

6. An engine starter including an inclosing frame, a main shaft extending through the frame and rotatably supported relatively thereto, a gear-wheel rotatable on the shaft and having a hub that extends through the frame, a collar secured to the hub at the outer side of the frame and having a slot therein extending from the periphery thereof eccentrically to the axis of the shaft, the collar having a recess at the inner end of the slot, a spring having a loop on its inner end which is inserted into the recess, the spring extending through the slot and being wound upon itself about the collar, a plug in the loop, means for holding the outer end of the spring, and means for connecting the gear-wheel with the shaft for winding the spring.

7. An engine starter including an inclosing frame, a shaft rotatable in the frame, a gear-wheel on the shaft to be rotated thereby and having a ratchet-wheel thereon, a spring connected with the gear-wheel to be put under stress thereby, a plurality of dogs mounted movably on the frame and spring-pressed into engagement with the ratchet-wheel to hold the spring under stress, a retracting device comprising a movable annular frame extending about the shaft adjacent to the dogs and provided with an operating arm thereon, means for guiding the annular frame concentrically to the shaft, means for enabling the annular frame to retract the dogs when moved in one direction, and a spring connected with the inclosing frame and the operating arm for moving the annular frame in the opposite direction.

8. An engine starter including an inclosing frame, a main shaft in the frame and rotatably supported relatively thereto, a large toothed wheel in the frame rotatable on the shaft and having a ratchet-wheel thereon, a dog mounted movably on the frame in contact with the ratchet-wheel, a spring operatively connected at its inner end with the gear-wheel to be wound thereby, a relatively small toothed wheel rotatable on the shaft, a counter-shaft mounted rotatably on the inner side of the frame and having two pinions secured thereto, one pinion being in mesh with the small toothed wheel and the other in mesh with the large toothed wheel, means for holding the outer end of the spring, clutching mechanism for connecting the small toothed wheel detachably to the shaft, and clutching mechanism for connecting the shaft detachably to the large toothed wheel.

9. An engine starter including an inclosing frame, a shaft rotatably supported in the frame, a gear-wheel rotatable on the shaft and having a clutch device and a ratchet-wheel thereon, a spring connected with the gear-wheel to be put under stress thereby on rotation of the shaft in one direction, a dog mounted on the frame in contact with the ratchet-wheel, an annular clutch member splined on the shaft and movable into engagement with the clutch device of the gear-wheel and having a plurality of inclined ribs on the periphery thereof, and a dog mounted pivotally on the frame and adapted to engage the ribs for forcing the clutch member from the clutch device on rotation of the shaft in the opposite direction.

10. An engine starter including a frame, a rotatable shaft, a large toothed wheel rotative on the shaft and having a ratchet-wheel thereon, a dog mounted on the frame in contact with the ratchet-wheel, a spring operatively connected at one end to the hub of the toothed wheel and wound upon itself, a relatively small toothed wheel rotative on the shaft, a counter-shaft rotatably mounted in the frame and having a pinion thereon in mesh with the large toothed wheel and having also a pinion in mesh with the small toothed wheel, clutching mechanism for detachably connecting the large toothed wheel with the shaft, a lever pivotally mounted on the frame and connected near one side of the pivot thereof to the outer end of the spring to be moved thereby in one direction, a rod pivoted to the lever beyond the opposite side of the pivot thereof, clutch-coupling mechanism for detachably connecting the small toothed wheel to the shaft and operatively connected with the rod, and a spring connected to the frame and operatively connected with the rod and the clutch-coupling mechanism and acting to move the lever in the opposite direction.

11. An engine starter including a rotatable shaft, a rotative gear-wheel, a movable guided controlling device, a spring connected with the gear-wheel to be put under stress thereby and having connection with the controlling device for control thereof, a clutch member operatively connected with the gear-wheel, and movable clutch mechanism for connecting and disconnecting the shaft with the clutch member and operatively connected with the movable controlling device.

12. An engine starter including a rotatable shaft, a gear-wheel rotative on the shaft and having a clutch device and a ratchet-wheel thereon, a spring connected with the gear-wheel to be put under stress, a movably-supported dog normally engaging the ratchet-wheel to hold the spring under stress, a guided movable retractor for moving and holding the dog out of engagement with the ratchet-wheel, a clutch member splined on the shaft and movable into engagement with the clutch device of the gear-wheel, movable controlling means, and means connecting the movable retractor and the movable clutch member with the controlling means to be moved thereby.

13. An engine starter including a rotatable shaft, a rotative gear-wheel, a movable guided controlling device, a spring connected with the gear-wheel to be put under stress thereby and having connection with the controlling device and when under stress moving the device in one direction, a clutch member operatively connected with the gear-wheel, movable clutch mechanism for connecting and disconnecting the shaft with the clutch member and operatively connected with the movable controlling device, means for automatically moving the controlling device in the opposite direction when the spring is relieved of stress, and automatic means for accelerating the movements of the clutch mechanism acting on the controlling device.

14. An engine starter including a rotatable shaft, a frame, a gear-wheel rotative on the shaft and having a clutch-device and a ratchet-wheel thereon, a spring connected with the gear wheel to be put under stress, a plurality of dogs mounted movably on the frame and spring-pressed into engagement with the ratchet-wheel to hold the spring under stress, a guided movable retractor mounted on the frame for moving the dogs out of engagement with the ratchet-wheel, means for moving the retractor to move the dogs, movable clutching means for connecting the clutch device of the gear-wheel with the shaft to enable the spring to rotate the shaft, and means for automatically moving the clutching means in advance of movement of the dogs from engagement with the ratchet-wheel on movement of the means for moving the retractor.

15. An engine starter including a rotatable shaft, a frame, a gear-wheel rotative on the shaft and provided with a latch-retractor, a spring connected with the gear-wheel to be put under stress thereby, a dog mounted movably on the frame for normally holding the spring under stress, a dog-retractor mounted on the frame and movable to retract the dog for releasing the spring, means for enabling the released spring to rotate the shaft in one direction by release of its stress, automatically operating means enabling the shaft on rotation in that one direction to rotate the gear-wheel to increase the stress on the spring, a latch mounted movably on the frame and automatically engaging and holding the dog-retractor when moved to retract the dogs, the latch being adapted to be engaged and retracted to release the dog-retractor by the latch-retractor on rotation of the gear-wheel to increase the stress on the spring, and means for reversing the movement of the dog-retractor when released.

16. An engine starter including a frame, a rotatable shaft, a gear-wheel rotatable on the shaft, a spring connected with the gear-wheel to be put under stress thereby and thereby rotate the shaft, a toothed wheel rotatable on the shaft and having a clutch device thereon, a clutch member mounted on the shaft and movable to fixedly connect the shaft to the clutch device for rotating the toothed wheel, gearing connecting the toothed wheel operatively with the gear-wheel for enabling the shaft to put the spring under stress, means for moving the clutch member, means for retracting the clutch member, a clutch member splined on the shaft and movable to connect or disconnect the shaft with the gear-wheel, means for moving the splined clutch member to connect the shaft with the gear-wheel to be moved thereby in one direction, and means mounted on the frame automatically acting on rotation of the shaft in reverse direction to move the splined clutch member for disconnecting the shaft from the gear-wheel.

17. An engine starter including a frame, a rotatable shaft, a power-spring extending about the shaft, a gear-wheel connected with the inner end of the power-spring, a toothed wheel rotative on the shaft and having a clutch device thereon, gearing mounted on the frame and operatively connecting the gear-wheel with the toothed wheel, a clutch member mounted on the shaft and movable into engagement with the clutch device for enabling the shaft to put the power-spring under stress, movable clutch-operating means for moving the clutch member into and out of engagement with the clutch device and operatively connected with the outer end of the power-spring to be moved thereby when under stress to move the clutch member out of engagement with the clutch device, a retracting-spring connected with the clutch-operating means for operation thereof to move the clutch-member into engagement with the clutch device when the power-spring is relieved of stress, and means for enabling the power-spring to rotate the shaft when the clutch member is out of engagement with the clutch device.

In testimony whereof, I affix my signature in presence of two witnesses.

JAMES M. ELDER.

Witnesses:
E. T. SILVIUS,
J. H. GARDNER.